US012383455B2

(12) United States Patent
Lipshaw et al.

(10) Patent No.: US 12,383,455 B2
(45) Date of Patent: Aug. 12, 2025

(54) PNEUMATIC COMPRESSION SYSTEMS AND COMPRESSION TREATMENT METHODS

(71) Applicant: MEDI USA, L.P., Whitsett, NC (US)

(72) Inventors: Moses Lipshaw, Hillsborough, NC (US); Steven B. Frazier, Sloatsburg, NY (US); Robert Deutsch, Oak Ridge, NJ (US); John Reuss, Westfield, MA (US)

(73) Assignee: MEDI USA, L.P.

( * ) Notice: Subject to any disclaimer, the term of this patent is extended or adjusted under 35 U.S.C. 154(b) by 872 days.

(21) Appl. No.: 17/437,399

(22) PCT Filed: Mar. 8, 2019

(86) PCT No.: PCT/US2019/021447
§ 371 (c)(1),
(2) Date: Sep. 8, 2021

(87) PCT Pub. No.: WO2020/185199
PCT Pub. Date: Sep. 17, 2020

(65) Prior Publication Data
US 2022/0168171 A1 Jun. 2, 2022

(51) Int. Cl.
*A61H 9/00* (2006.01)

(52) U.S. Cl.
CPC ..... *A61H 9/0092* (2013.01); *A61H 2201/165* (2013.01); *A61H 2201/5071* (2013.01)

(58) Field of Classification Search
CPC ...... A61H 9/0092; A61H 9/0078; A61H 9/00; A61H 9/005; A61H 2201/165; A61H 2201/5071; A61H 2201/5056; A61H 2209/00; A41D 13/0155; A61F 5/34; A61F 5/012; A61B 5/107
USPC .................................................. 606/201, 202
See application file for complete search history.

(56) References Cited

U.S. PATENT DOCUMENTS

| | | | | |
|---|---|---|---|---|
| 5,186,163 A * | 2/1993 | Dye | A61H 9/0078 | 601/152 |
| 5,342,285 A * | 8/1994 | Dye | A61H 9/0078 | 601/151 |
| 5,478,119 A * | 12/1995 | Dye | A61H 9/0078 | 285/914 |
| 6,051,016 A * | 4/2000 | Mesaros | A61B 17/1355 | 606/202 |
| 6,629,941 B1 * | 10/2003 | Ishibashi | A61H 9/0078 | 601/152 |
| 7,591,796 B1 * | 9/2009 | Barak | A61H 9/0078 | 601/152 |
| 9,839,573 B2 * | 12/2017 | Mansur, Jr. | A61H 9/0078 | |
| 9,968,294 B2 * | 5/2018 | Bichel | A61B 5/4836 | |

(Continued)

FOREIGN PATENT DOCUMENTS

| | | | |
|---|---|---|---|
| EP | 2727572 A1 * | 5/2014 | A61H 9/0092 |
| SG | 192393 A1 * | 8/2013 | A61H 9/0078 |

(Continued)

*Primary Examiner* — Timothy A Stanis
*Assistant Examiner* — Tyler A Raubenstraw
(74) *Attorney, Agent, or Firm* — Rimon PC

(57) ABSTRACT

The present invention relates to automated methods of applying compression to the body of a subject comprising a fitting cycle and a treatment cycle, including related devices, systems, and processors.

20 Claims, 11 Drawing Sheets

(56) References Cited

U.S. PATENT DOCUMENTS 10,226,211 B2 * 3/2019 Barak .................. A61B 5/0205
10,617,594 B2 * 4/2020 Fujishiro .............. A61H 9/0078
2004/0106884 A1 * 6/2004 Bolam ................. A61H 9/0078 601/152
2007/0088239 A1 * 4/2007 Roth .................... A61H 9/0078 601/152
2007/0213650 A1 * 9/2007 Raley ................... A61H 9/0078 604/4.01
2008/0045866 A1 * 2/2008 Rastegar .............. A61H 9/0092 601/9
2011/0093003 A1 * 4/2011 Lee .................... A61B 17/1355 606/201
2011/0190675 A1 * 8/2011 Vess ...................... A61F 13/085 601/152
2012/0065561 A1 * 3/2012 Ballas .................. A61H 9/0092 601/152
2012/0083712 A1 * 4/2012 Watson ................ A61B 5/7275 600/587
2013/0018291 A1 * 1/2013 Kraal ................... A61H 9/0078 601/149
2013/0204106 A1 * 8/2013 Bennett ................ A61B 5/0022 600/324
2013/0237889 A1 * 9/2013 Wright ................. A61H 9/0092 601/149
2014/0052028 A1 * 2/2014 Wright ................... A61H 1/006 600/592
2014/0236058 A1 * 8/2014 Lee ...................... A61H 9/0078 601/84
2014/0236060 A1 * 8/2014 Deshpande ........... A61F 13/085 601/152
2014/0296757 A1 * 10/2014 Leschinsky ............ A61H 1/006 601/152
2014/0303533 A1 * 10/2014 Zeutzius .............. A61H 9/0092 601/151
2014/0309568 A1 * 10/2014 Pickett ................. A61H 9/0078 601/152
2015/0224011 A1 * 8/2015 Scott ...................... A61H 7/001 601/84
2015/0224012 A1 * 8/2015 Wright ................. A61H 9/0078 601/150
2015/0297132 A1 * 10/2015 Bichel ................... A61B 5/1116 600/595
2016/0000595 A1 * 1/2016 Sorg .......................... A61F 5/01 606/201
2016/0030267 A1 * 2/2016 Lipshaw ................. A61F 13/10 601/84
2016/0058654 A1 * 3/2016 Denson ................ A61H 9/0092 601/150
2016/0129186 A1 * 5/2016 Douglas ............... A61H 9/0085 601/84
2016/0166463 A1 * 6/2016 Douglas .................. A61F 5/012 601/150
2016/0166464 A1 * 6/2016 Douglas ............... A61H 9/0078 601/84
2016/0262971 A1 * 9/2016 Doron .................. A61B 5/1073
2016/0271411 A1 * 9/2016 Hummel .................. A61N 1/44
2017/0100301 A1 * 4/2017 Denson ................ A61H 9/0078
2017/0172838 A1 * 6/2017 Brosnan ............... A61H 9/0078
2017/0181921 A1 * 6/2017 Wren ...................... A61H 11/00
2017/0196763 A1 * 7/2017 Obma .................. A61H 9/0078
2017/0258672 A1 * 9/2017 Wennen ............... A61H 9/0078
2017/0273851 A1 * 9/2017 Larmer ................... A61F 13/08
2017/0311847 A1 * 11/2017 Wright ................. A61B 5/1074
2017/0319420 A1 * 11/2017 Saggers ............... A61H 9/0092
2017/0354544 A1 * 12/2017 Lipshaw ............... A61F 13/104
2018/0161200 A1 * 6/2018 Wilford ..................... A61F 7/02
2018/0360463 A1 * 12/2018 Rubinstein ........... A61H 9/0092
2019/0000329 A1 * 1/2019 Denson .............. A61B 5/02438
2019/0133871 A1 * 5/2019 Chase ................... A61F 13/085
2019/0133873 A1 * 5/2019 Chase .................. A61H 9/0078
2019/0167509 A1 * 6/2019 Wright ................. A61H 9/0092
2019/0293191 A1 * 9/2019 Ben-Shalom ........ A61H 9/0078
2020/0113773 A1 * 4/2020 Ramanan ............. A61H 9/0078
2020/0237606 A1 * 7/2020 Colosi ................ A63B 69/0057
2021/0156878 A1 * 5/2021 Derman ............. G01N 35/1009

FOREIGN PATENT DOCUMENTS

WO WO-2014021361 A1 * 2/2014 ............... A61H 7/00
WO WO-2016148956 A1 * 9/2016 ....... A61B 17/12109

* cited by examiner

PNEUMATIC COMPRESSION SYSTEMS AND COMPRESSION TREATMENT METHODS

CROSS-REFERENCE TO RELATED APPLICATIONS

This application claims priority to Patent Cooperation Treaty application serial number PCT/US2019/021447, filed Mar. 8, 2019, the contents of which are incorporated herein by reference in their entirety.

BACKGROUND

Lymphedema is swelling that occurs when excessive protein-rich lymph fluid accumulates in the interstitial tissue. This lymph fluid may contain plasma proteins, extravascular blood cells, excess water, and parenchymal products. Lymphedema is one of the most poorly understood, relatively underestimated, and least researched complications of common diseases like cancer, and thus the prevalence of lymphedema within the general population is largely unknown. Nevertheless, for those who are diagnosed with lymphedema, the standard of care consists of meticulous skin care, manual lymphatic drainage, exercise therapy, inelastic compression bandaging and, eventually, compression garments/sleeves.

In therapy during the initial decongestive phase, manual lymphatic drainage is utilized to massage the body to move lymph fluid. In one aspect, pneumatic inflation using a sleeve with a pump can be utilized to create the massage effect to move lymph fluid. The frequency and duration of care is dependent on individual subject's therapeutic need and may range from 2 to 3 visits per week for 6 or more weeks depending on the severity of lymphedema and any other associated impairment. Thereafter, during the maintenance phase, the patient must continue to utilize compression garments and/or pneumatic systems to maintain their decongested state. A variety of system, pneumatic or sleeve failures or sub-optimizations may occur or be present without notice in a pneumatic system, thus affecting treatment. The present invention addresses this and other related needs in the art.

SUMMARY

According to the presently disclosed embodiments, a method (optionally an automated method) of applying compression to the body of a subject is provided, comprising at least one fitting cycle and at least one treatment cycle, wherein the fitting cycle comprises: in one or more cycles delivering or removing an amount of a fluid to a chamber of a compression sleeve sufficient to adjust the chamber to a calculated internal pressure comprising a predetermined percentage of a treatment pressure target and an adjustment factor, and measuring an actual internal pressure of the sleeve; wherein the treatment cycle comprises: in one or more cycles following a fitting cycle, delivering or removing an amount of a fluid to a chamber of a compression sleeve sufficient to adjust the chamber to a calculated internal pressure comprising a predetermined percentage of a treatment pressure target and an adjustment factor. Often, according to these methods, an adjustment factor for a cycle is zero or null. According to frequent embodiments, an adjustment factor for a cycle is based wholly or in part on a difference between a calculated internal pressure, an actual internal pressure measurement, a treatment pressure target, and/or another adjustment factor. Often, an adjustment factor for a cycle is based at least partially, or wholly, on a delivery constant.

According to the presently disclosed embodiments of the system or its operation, the fluid may be removed or permitted to escape from the chamber between two or more delivering cycles. Also, fluid may be added to the chamber between two or more delivering cycles.

According to the presently disclosed embodiments of the system or its operation, the calculated internal pressures are often limited to avoid the actual internal pressure of the sleeve exceeding the treatment pressure target. The calculated internal pressures are also often limited to avoid an actual internal pressure of the sleeve dropping below the treatment pressure target. In a delivery cycle of a fitting cycle or treatment cycle the actual internal pressure of the sleeve often reaches an approximate treatment pressure target.

According to the presently disclosed embodiments of the system or its operation, measuring the actual internal pressure of the sleeve often comprises measurement of an internal and/or external chamber pressure.

In frequently included embodiments, a method of applying compression to the body (including any part thereof) of a subject is provided, comprising a fitting cycle and a treatment cycle, wherein the fitting cycle comprises delivering or removing an amount of a fluid to a chamber of a compression sleeve sufficient to inflate/adjust the chamber to a first calculated internal pressure comprising a predetermined percentage of a first pressure target, and measuring a first actual internal pressure in the chamber; determining a pressure difference comprising a difference between the first actual internal pressure and the first calculated internal pressure; in one or more cycle, delivering or removing an amount of the fluid to the chamber of the compression sleeve sufficient to inflate/adjust the chamber to a subsequent calculated internal pressure comprising a predetermined percentage of a subsequent pressure target plus the pressure difference, and measuring a subsequent actual internal pressure in the chamber; and wherein the treatment cycle comprises: in one or more cycle, delivering or removing an amount of the fluid to the chamber of the compression sleeve sufficient to inflate/adjust the chamber to a predetermined internal pressure comprising a treatment pressure target plus the subsequent pressure target pressure measured at the treatment pressure target in the fitting cycle. Often, the methods are implemented in an automated manner such that manual input is not required between cycles and/or between regimens. In certain embodiments involving external inputs no manual input to starting, stopping of changing a treatment cycle or regimen is not required at all. Often, an amount of the fluid is delivered to or removed from a chamber of a compression sleeve sufficient to inflate/adjust the chamber to a first internal pressure prior to inflating the chamber to a first calculated internal pressure. Also often, the pressure difference further comprises a pressure drop factor.

According to frequently preferred methods, a predetermined increase or relative increase to treatment pressures is provided during an exemplary pressure adjustment phase or fitting cycle. This prevents pressures from exceeding the desired therapy pressure and optionally permits for further inflation/adjustment cycles, e.g., without removing fluid, to make further fitting adjustments. Moreover, as discussed herein, an adjustment factor generally accounts for any type of fitting adjustment contemplated herein, including measurement differences, pressure drop constants, etc. A pressure drop factor is often inherent of the pneumatic system design due to materials, geometry, tube length, diameter, etc., which are often be accounted for in this adjustment factor.

Often according to frequently included embodiments, the fluid delivery rate or outflow of fluid from the pump is adjusted or adjustable to alter a cycle time or a therapy effect. In this regard, the adjustment of the internal pressure of a chamber may occur over a longer or a shorter period of time based on an adjustment of the fluid delivery rate or outflow of fluid from the pump. Moreover, the therapy effect may be adjusted by altering the fluid delivery rate or outflow of fluid from the pump to provide a more gradual or a more rapid adjustment of internal pressure of a chamber. In related embodiments, the system and/or processor software is adapted to provide such an adjustment of cycle time or therapy effect.

In frequently included embodiments, the chamber comprises a plurality of chambers. Often, the plurality of chambers, or two or more of the plurality of chambers, are not in fluid communication with one-another within in the sleeve.

Often, according to certain included embodiments, the predetermined percentage of a first, second or subsequent pressure target increases between each fitting cycle.

In frequently included embodiments, a system for carrying out a method of applying compression to the body of a subject is provided, wherein the system comprises a pump adapted to pump the fluid and a fluid pathway situated between the pump and a vent valve, wherein a check valve, a plurality of pressure valves, a pressure transducer, and an output block are provided in the fluid pathway. Often, a pressure sleeve is included with the system and detachable to/from the output block. Often, the system operation or operating system of the system includes machine readable and executable instructions for carrying out the method steps noted above and herein.

Often according to the included embodiments, each of the plurality of pressure valves is operable between an open state and a closed state, and wherein each of the plurality of pressure valves is operable independently or concurrently with each other of the plurality of pressure valves. Also often, the pressure transducer comprises a single pressure transducer. Often according to the disclosed embodiments, two or more of the plurality of pressure valves is provided in unwired operable connection with a printed circuit board. Often this connection is a soldered connection. Often, according to frequent embodiments herein, the pressure transducer is soldered to the PCB.

Often according to the disclosed embodiments, the output block comprises a plurality of input ports, each in communication with one or more output ports, wherein the number of input ports is less than a total number of the one or more output ports. Often, wherein each of the plurality of pressure valves is situated in the fluid pathway between the output block and the check valve. Also often, the compression sleeve comprises two or more chambers, each of the two or more chambers in internal fluid communication with two or more fluid conduits, and wherein each of the two or more fluid conduits is adapted to be attachable in internal fluid communication with one of the one or more output ports. In frequently included embodiments, the system or device includes between 2 to 20 pressure valves together with between 4 to 40 output ports.

Frequently according to the disclosed embodiments, one or more compression sleeves are attachable to output block. Also in frequently included embodiments, the pressure transducer comprises a single pressure transducer in fluid communication with the chamber, and the pressure transducer is adapted to measure the actual internal pressure. Often according to the present disclosure, the pressure transducer comprises a single pressure transducer in fluid communication with the 4 to 40 or more output ports, and the pressure transducer is adapted to measure the actual internal pressure.

In other frequent embodiments of the present disclosure, a processor adapted to carry out a method of applying compression to the body of a subject is provided, wherein the processor is present in a pneumatic compression system and adapted to independently operate a plurality of valves, and/or a pump in the system, and wherein the processor is further configured to receive pressure data from a pressure transducer and in an automated manner based on the received pressure data, operate the pump and/or valves. Often, the method involves the method steps noted above and herein.

In the embodiments contemplated herein, the system or device, system and/or processor hardware, software or other computer-implemented code, where utilized, are adapted to implement the various methods discussed herein.

These and other embodiments, features, and advantages will become apparent to those skilled in the art when taken with reference to the following more detailed description of various exemplary embodiments of the present disclosure in conjunction with the accompanying drawings.

BRIEF DESCRIPTION OF THE DRAWINGS

The skilled person in the art will understand that the drawings, described below, are for illustration purposes only.

Figure 1A:
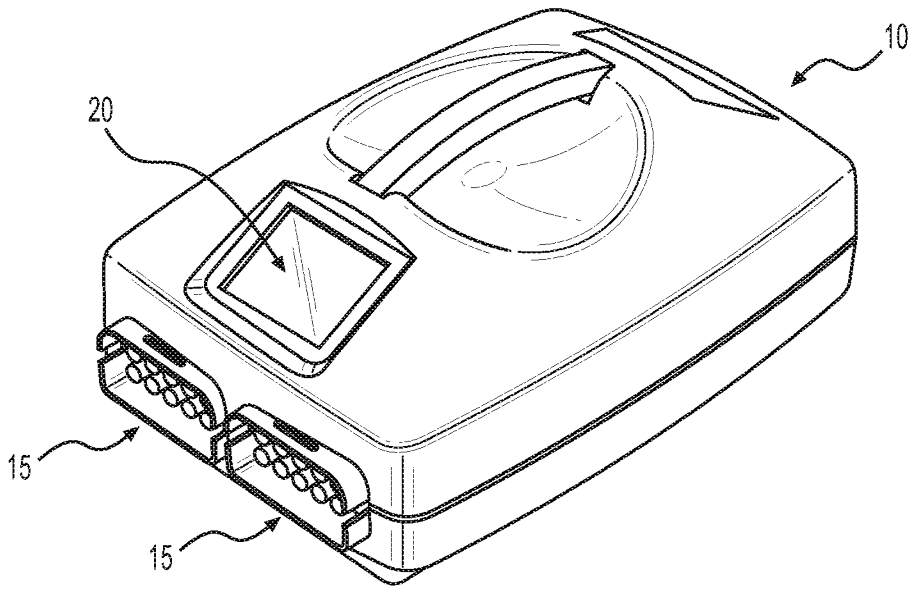
FIG. 1A-1D depicts an exemplary Pressure Control Unit of an exemplary system.

For clarity of disclosure, and not by way of limitation, the detailed description of the invention is divided into the subsections that follow.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, the term "and/or" may mean "and," it may mean "or," it may mean "exclusive-or," it may mean "one," it may mean "some, but not all," it may mean "neither," and/or it may mean "both."

As used herein, the term "subject" is not limited to a specific species. For example, the term "subject" may refer to a patient, and frequently a human patient. However, this term is not limited to humans and thus encompasses a variety of mammalian species.

As used herein, the term "cycle" has a broad meaning not limited to one of a series of identical events and instead includes a meaning encompassing a specific part of a single repetition of a series.

The present system provides a software driven compression therapy system adapted to apply pressure to the body for applications such as massage, sports recovery, and the treatment of circulatory disorders such as lymphedema, venous insufficiency, peripheral edema, dysfunction of the muscle pump, and deep vein thrombosis (DVT) prevention, venous stasis ulcers, varicose vein conditions, and discomfort from leg fatigue. The most frequent embodiment comprises a reusable mechanical pump (e.g., diaphragm pump) for circulating and extracting fluid (e.g., gas or liquid, usually air), which is used with one or a plurality (e.g., two or more) of compression sleeves. The sleeves are worn on the body of a subject during use of the system during pressure application cycles. In operation, each sleeve connected with the system fills and deflates with fluid to during a pressure application cycle to provide compression to a specific area of the body, which generally comprises the area where the sleeve is worn. Each compression sleeve contains integral tubing and a connector for connection to the pump, so that the pump controller may inflate and/or deflate the individual chambers of the sleeve in a predetermined sequence, e.g., as determined by the software and settings.

The user interfaces with the software through a graphical user interface (GUI) or other control methods (e.g., analog) to change settings and run treatment. The software, where present, controls the hardware interfacing through a printed circuit board with processor: a compressor, solenoid valves, pressure sensor, and clock to control the magnitude and duration of pressure to the connected sleeve(s) to perform therapy. The system may also, in certain embodiments, interface with a notification system to alert a user of the system to errors or other events such as setting changes or end of treatment.

The system optionally interfaces with other sensors, physiological monitoring systems, and/or other inputs, to perform and/or adjust therapy (together "external inputs"). For example, often the posture or physical positioning of the subject is accounted for during treatment, with pressure levels adjusted accordingly. Also, other physiological conditions could be monitored on the best time to run treatment. Such sensors may be utilized to identify therapy adjustments and/or to determine when to start or stop therapy. In this regard, an accelerometer may be employed to detect changes in posture, so that when the patient is supine and gravitational force effects on the movement of fluids reduced, the treatment is adjusted accordingly. According to another embodiment involving an external input, an ABI test routine or indicator is evaluated as a component of adjusting treatment pressures. In such embodiments, the ABI index for the subject may be a factor considered in the system for treatment pressure adjustment or whether to begin or continue treatment. For example, based on this evaluation treatment may be delayed. Also based on this evaluation, the pressure level of pressure applied to a chamber may be adjusted, initially or between cycles.

Moreover, an external pressure sensor may also be employed as an external input to monitor the environmental pressures for the system to adjust the treatment pressures and cycles accordingly (e.g., in space or water). The term "external input" is intended to be not limited to sensors that are external to the present exemplary systems and its component parts and compression sleeves nor require a physical input to provide data transfer. Also, therefore, an external input encompasses data sources that provide data input to the present exemplary systems that are embedded therein in the system architecture, or physically included with other aspects of the present exemplary systems, or obtainable by the systems. A variety of external inputs are contemplated. For example, a temperature sensor may optionally be employed as an external input to monitor skin temperature to activate or deactivate therapy based on measured skin temperature. A strain gauge may optionally be employed as an external input to detect swelling of a limb subject to treatment by the system, and to activate therapy based on this measurement. In frequent embodiments contemplated herein, one or more external inputs are provided in data communication with the present exemplary systems, or consulted as part of an input to the present exemplary systems for starting, stopping, or adjusting therapy using the system. An adjustment to the therapy may comprise altering a fitting or treatment regimen or cycle in terms of compression level, number of compression cycles, duration of compression delivered in one or more cycle, periodic timing of treatment regimens, selection of which sleeve or chamber to inflate/adjust or evaluate for pressure, etc.

According to frequently preferred methods, a predetermined increase or relative increase to treatment pressures is provided during an exemplary pressure adjustment phase or fitting cycle. This prevents pressures from exceeding the desired therapy pressure and optionally permits for further inflation/adjustment cycles, e.g., without removing fluid, to make further fitting adjustments.

In particularly preferred embodiments, a difference between the actual pressure measurement and the calculated internal pressure is provided. It is recognized in the present methods that, in certain circumstances during a fitting cycle the difference between the actual pressure measurement and the calculated internal pressure is, at least in part, based on one or more prior adjustment factors, for example to limit wide differences in pressure adjustment between successive cycles. Moreover, at the end of a fitting cycle, or prior to a treatment cycle, the difference between the actual pressure measurement and the calculated internal pressure may be based on the actual pressure measurement and treatment pressure target.

According to a series of related embodiments, a system or device for applying compression to the body (including any specific part thereof) is provided, the system or device comprising a pump adapted to pump the fluid and a fluid pathway situated between the pump and a vent valve, wherein a check valve, a plurality of pressure valves, a pressure transducer, and an output block are provided in the fluid pathway, and wherein a system comprising the system or device includes an external input selected from one or more of an external pressure sensor, a temperature sensor, a strain gauge, and/or a means for evaluating fluid flow rates.

The external input may comprise the system or device providing the input as well as the means for inputting the data to the system or device for purposes of starting, stopping, or altering a treatment regimen or cycle.

In a related exemplary method, a compression sleeve connected with an exemplary system or device is worn by a subject, and the system or device is signaled to begin, stop, or alter a treatment regimen or cycle by an external input selected from one or more of an external pressure sensor, a temperature sensor, a strain gauge, and/or a means for evaluating fluid flow rates.

Exemplary systems of the present disclosure are characterized by a direct valve connection to a printed circuit board (PCB), which eliminates intermediary wire/harness connections to actuate the valve, thereby improving manufacturing efficiency and cost, and also increasing serviceability, reliability and responsiveness of the system. Typical components of an exemplary system 10 include a Pressure Control Unit (PCU), a blocking plate 40, a sleeve connector 50, a compression sleeve, and a power supply. The PCU is a programmable pneumatic compressor with two connector outlets (FIGS. 1A-1D).

Figure 1B:
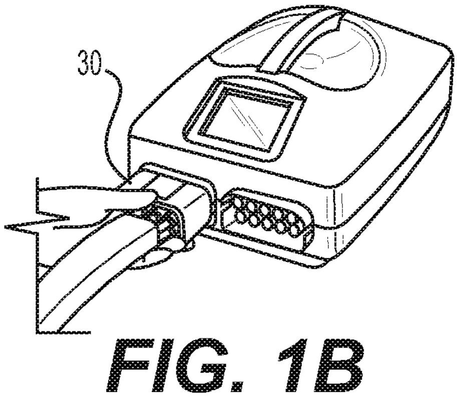
Figure 1C:
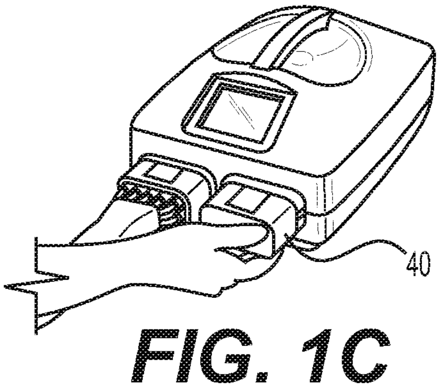
Figure 1D:
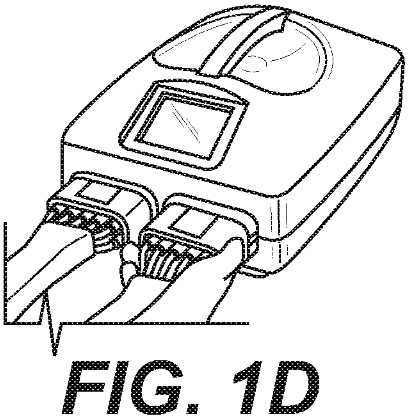

In the embodiment depicted in FIGS. 1A-1D, each connector 15 has ten outflow ports 68 into which the compression sleeve fluid conduits 32 plug. Air passes through the fluid conduits, delivering treatment through the sequential inflation and deflation of up to ten air chambers in the sleeves, or twenty chambers total if two sleeves are being used. By programming a treatment program using the touch-screen Graphical User Interface (GUI) 20, calibrated pressure is delivered to the chambers and assists in moving excess fluid out of affected limb(s). The blocking plate 40 is used to cover an open connector outlet. If the subject is using only one sleeve, you must install the blocking plate in the open connector outlet 15. The PCU and pneumatic tubing circuit is adapted such that it will not operate properly if there is an uncovered, open connector outlet (FIG. 1B). Also, the blocking plate 40 is not utilized when all ports are connected to compression sleeve(s) (FIG. 1D). The sleeve connector (FIG. 4B), it is observed, attaches an exemplary compression sleeve to the PCU. The number of available/open/closed ports on the PCU may take a variety of configurations and numbers in the embodiments contemplated herein.

Figure 2A:
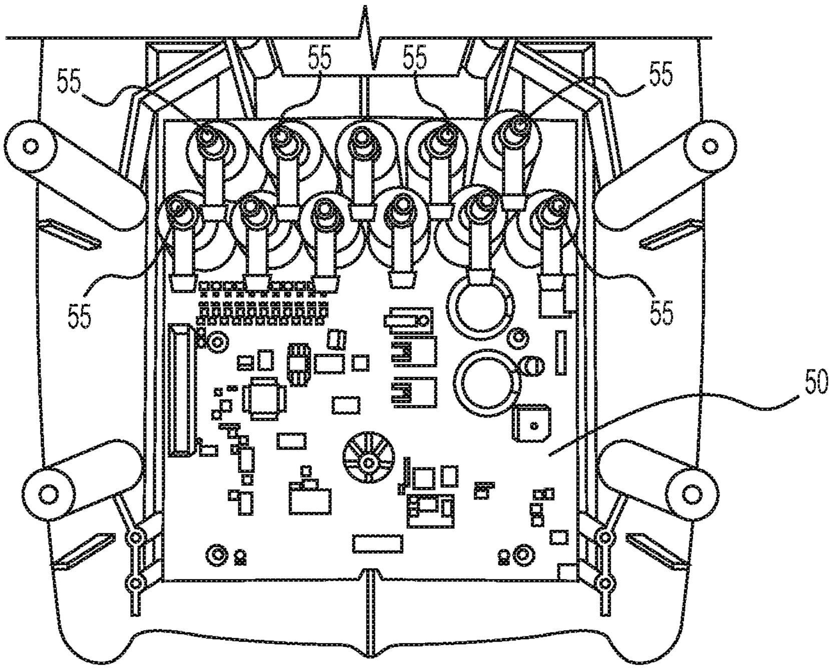
FIGS. 2A-2B depict an exemplary printed circuit board and output valve configuration of an exemplary system.

As depicted in FIG. 2A, eleven solenoid-controlled valves 55 are soldered directly to a PCB 50. Ten of the valves 55 are used for inflating the sleeves and one valve 55 is used to control venting to the atmosphere. In another embodiment, nine solenoid-controlled valves 55 are soldered to the PCB 50, including eight for inflation control and one for venting. The direct connection eliminates secondary connection and mounting needs for the valves reducing costs.

Figure 2B:
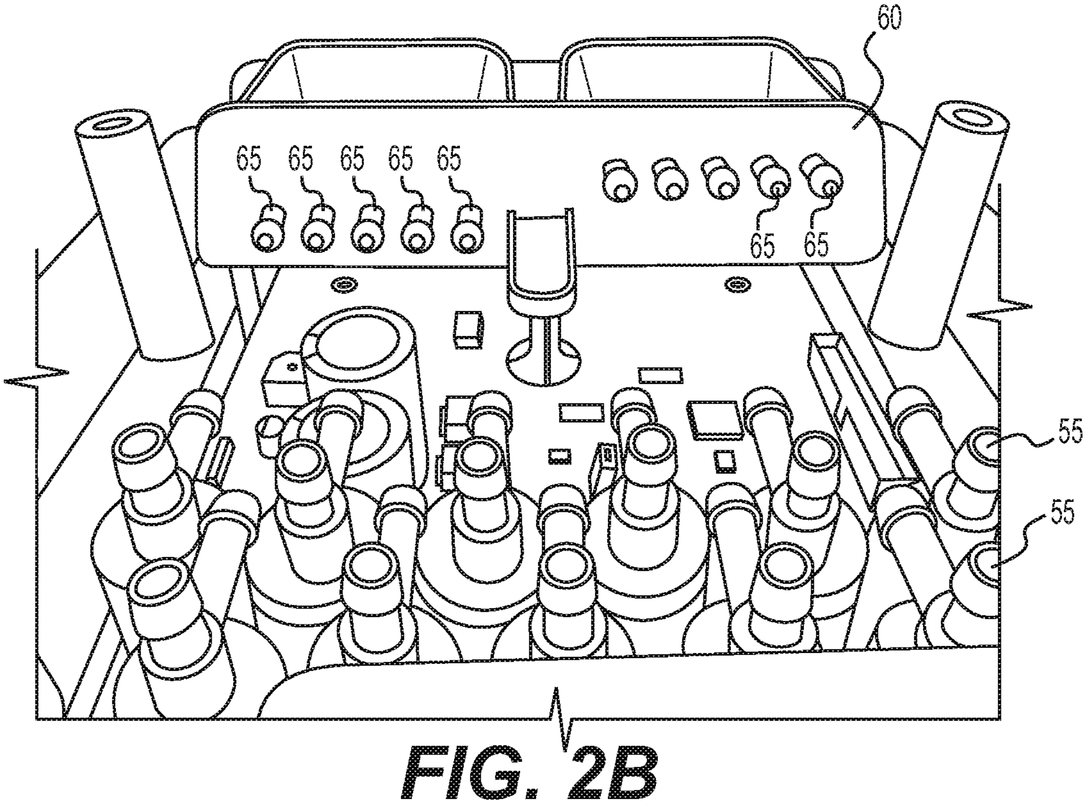
Figure 3A:
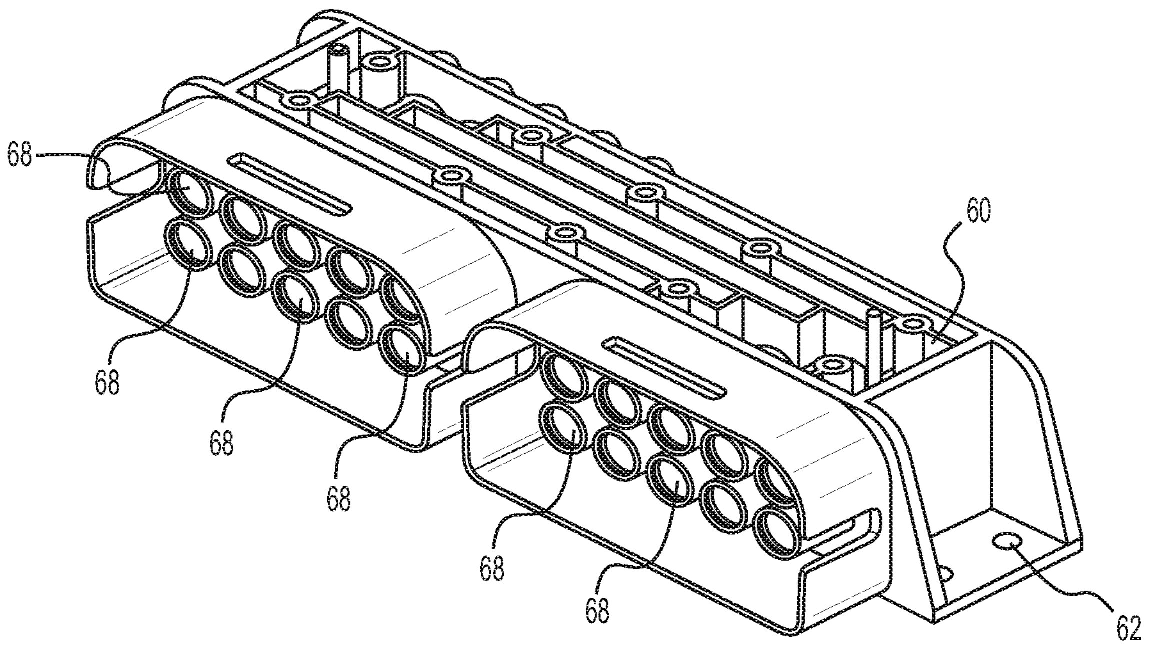
FIGS. 3A-3B depict an exemplary output block.
Figure 3B:
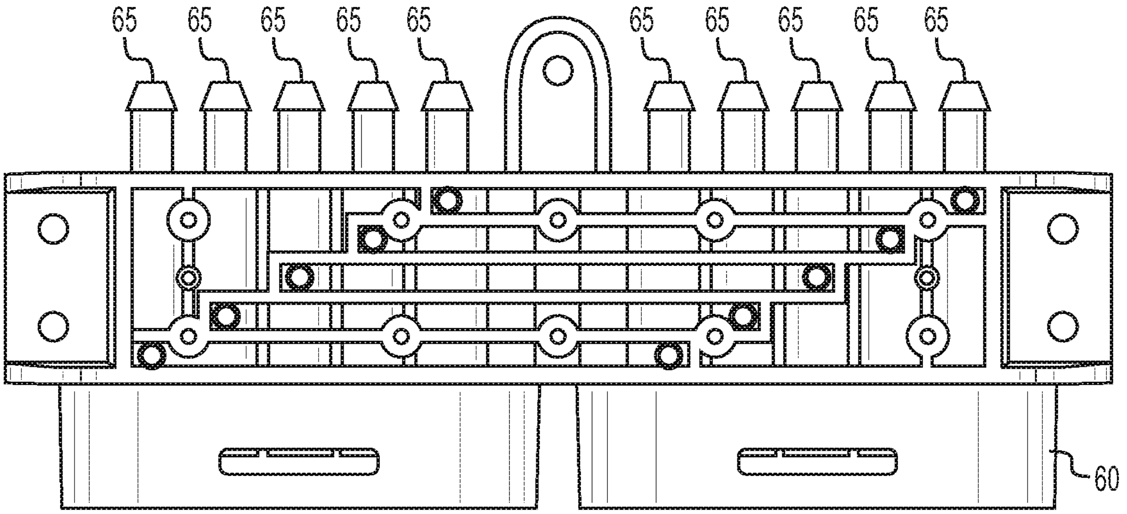

A doubling output block 60 (see FIGS. 2B, 3A, 3B) is provided, and is often comprised of a single molded part, thereby improving manufacturing efficiency, and reducing costs. The manifold directs the compressed air from each valve 55 connected to the PCB 50 and splits it to both the right and left sleeve ports. FIG. 2B. The valves 55 and output block inputs 65 are often connected by tubing. In certain embodiments, a single 10 to 20 port manifold output block 60 is provided to permit the division of fewer valves and fluid sources into a larger number of output ports 68. For example, eight valves are used in certain embodiments to convert to sixteen outputs, including two ports (e.g., the $9^{th}$ and the $10^{th}$ ports) remaining unconnected and idle. Output blocks with more or less ports are contemplated, as are different configurations of the number of port divisions.

Figure 4A:
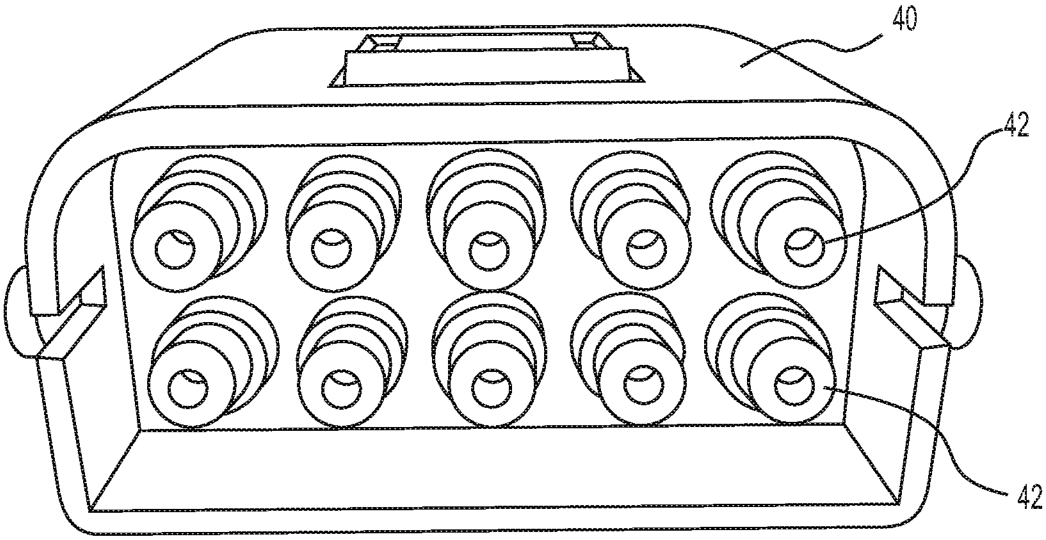
FIGS. 4A-4B depict an exemplary blocking plate and sleeve connector of an exemplary system.
Figure 4B:
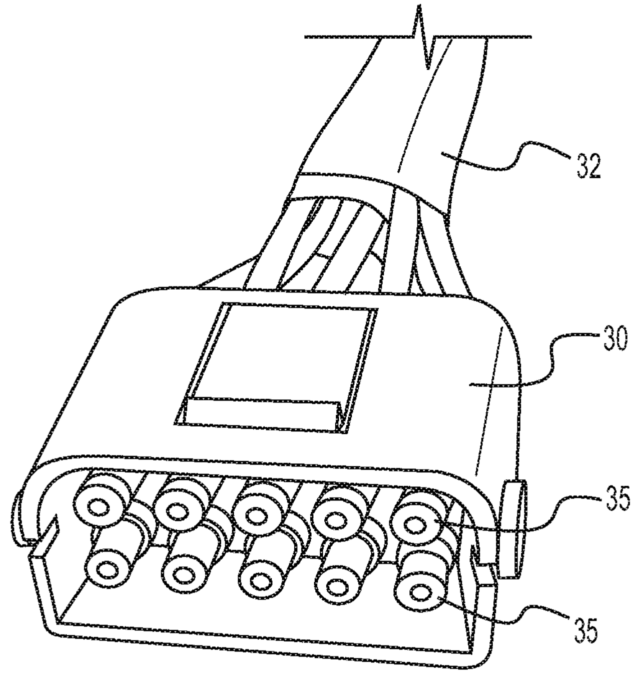

With regard to FIGS. 4A and 4B, an exemplary blocking plate 40 and sleeve connector 30 are depicted. Blocking plate nodules 42 are adapted to comprise a plug or have only a single proximal opening, and interface in an airtight manner with output ports 68. Sleeve connector nodules 35 are similarly adapted to interface in an airtight manner with output ports 68. Sleeve connector nodules 35 provide an access point to the fluid conduits 32 of the compression sleeve. In this regard, the connector nodules 35, when connected with the output ports 68, provide a fluid connection between the PCU and the compression sleeve.

Figure 5:
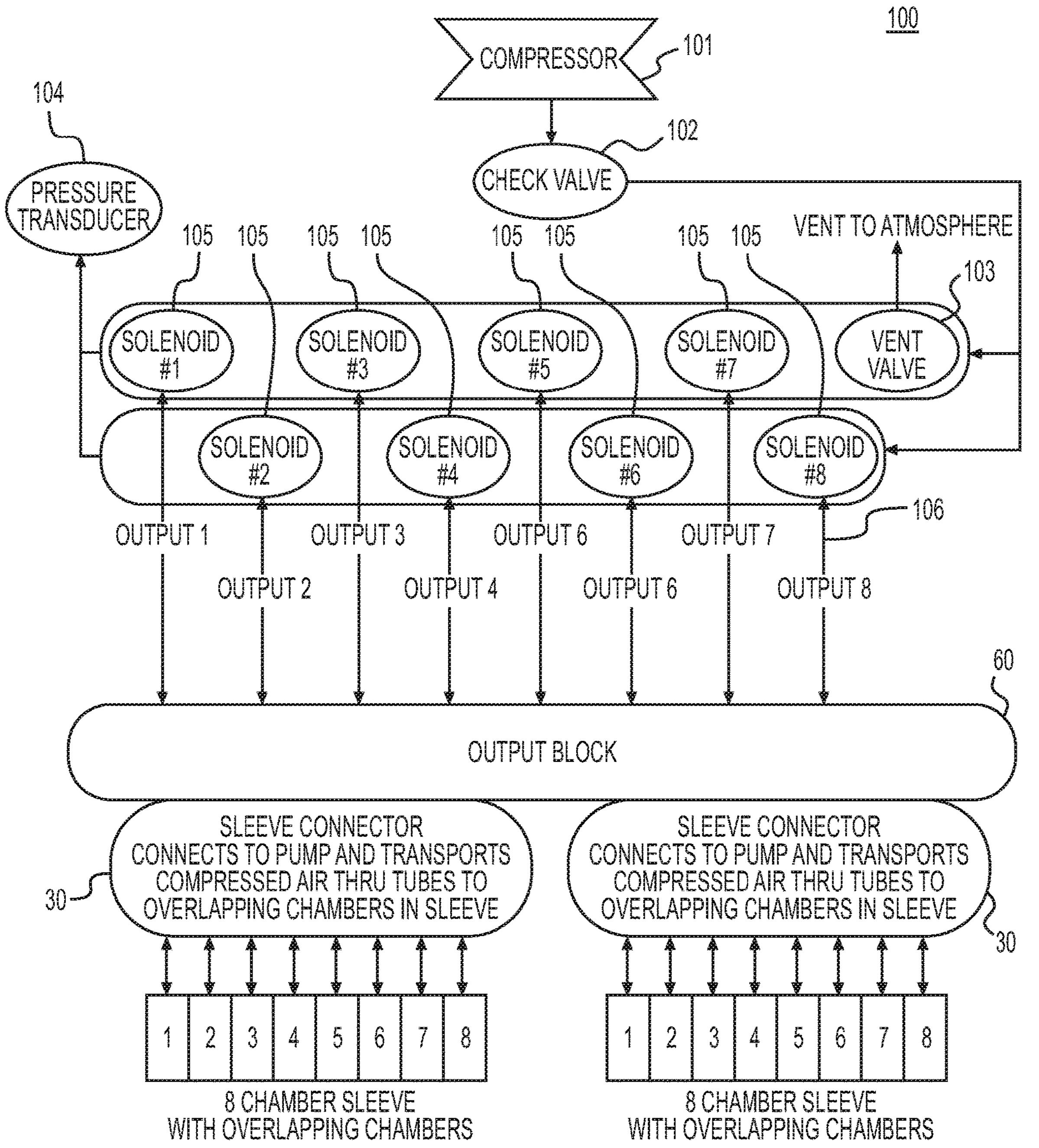
FIG. 5 provides an exemplary operational fluid flow schematic for the presently described systems.

FIG. 5 provides an exemplary operational schematic for the presently described systems. A check valve 102 is placed between the pump/fluid source 101 and the valve manifold comprising the valves 103, 105 and pressure transducer 104. This manifold comprises a contiguous unrestricted fluid pathway interconnecting the vent valve with the pressure transducer 104 and each solenoid valve 105. The check valve 102 eliminates, for example, pressure changes throughout the valve manifold that are often manifested by stopping the compressor. Moreover, this setup permits highly accurate pressure monitoring by the pressure transducer 104 within the manifold. The duties of the pressure transducer 104 for monitoring for leaks and blockages are enhanced through the use of the check valve 102. The pump system incorporates solenoid valves 105 that are configured to be closed when not actuated, i.e. power is not applied. This provides for power usage for pumping fluid (e.g., to apply pressure within the system) or venting. In frequent embodiments power is not consumed while holding sleeve or chamber in an inflated state reducing energy consumed and heat produced.

In operation, each valve 105 is independently operable between an open or closed state. The vent valve 103 are similarly operable independently of the valves 105. Thus, in a setting where a sleeve, or chamber thereof, has been inflated, the internal chamber pressure of each chamber connected with the system can be evaluated using a single pressure transducer 104 and without disturbing the pressure (if any) maintained in any other chamber of the sleeve. In this regard, to evaluate pressure of a specific chamber, the valve 105 is actuated to open and permit fluid flow to the pressure transducer for evaluation of the pressure in that chamber, while the vent valve and each other valve remains closed. To vent a chamber, while maintaining pressure in other chambers of the sleeve, the valve 105 for that chamber is opened and the vent valve 103 is opened. To vent all chamber, all valves 105 and the vent valve 103 are opened.

In certain exemplary embodiments, the pump 101 is connected to the PCB 50 via an pressure transducer 104. In such embodiments the tubing is connected directly to the pressure transducer 104 on the PCB.

System software is functionally integrated such that it can accept and evaluate data from the pressure transducer 104 and initiate action within the system based on this evaluation. For example, the software is often in functional communication with the pump 101 and configured such that each available port is evaluated to determine if it is blocked, leaking, or open to inflation. This evaluation is used, most frequently, as a safety feature to determine if any of the ports are blocked or leaking. In such cases of leaking, for example, the chamber does not properly inflate compromising the intended therapy pressure profile. Blocked port detection can also serve as connector configuration communication such as an active sleeve chamber count. In one exemplary embodiment a pump has 10 ports active to inflate sleeve chambers and a small 6-chamber sleeve is attached with open ports 1-6, and blocked ports 7-10. The software can be configured to "detect" that blockages in combined ports 7-10 are representative of a 6-chamber sleeve. The software can then, for example, adjust the therapy cycle to the sleeve type connected. It is to be understood that blocked/open ports could be used to communicate further configurations or instructions to the software.

One exemplary blocked/leaking/open port detection routine comprises the following:

1. Establishing at least one fill pressure point for a port;
2. Inflating the port until the at least one fill pressure is achieved;
3. Stopping inflation;
3. Measure a resulting pressure of the port;
4. Establishing at least one difference limit between a resulting pressure and a fill pressure;
5. Utilizing the difference limit to determine the status of a port (e.g. blocked, leaking, or normal).

Based on the blocked port determination a software-based decision can be made to deactivate the port, output an error to the user, adjust therapy, etc. For example, if a tube port is blocked, the volume of the intended fill area is greatly reduced. If the port is filled to 10 mmHg, for example, by the time the software and hardware reacts and stops the compressor inflation output, the pressure may have already increased well above the intended 10 mmHg pressure. By measuring the pressure after inflation, a limit can be established as to what pressure excess is indicative of pneumatic system volume reduction and/or a blocked port.

Similarly, a pressure drop limit can be established to determine if a port leaks which represents an increase in pneumatic system volume. For example, if the port is filled to 10 mmHg, for example, and inflation stops, the resulting pressure may be lower when inflation stopped due to pressure dynamic and stabilization to a static pressure. Further pressure drops beyond this stabilization drop could be indicative of leak(s) in the pneumatics, whereas known pressure changes within the normal operating range after inflation shut off, could be considered normal or open ports.

As indicated, the software is also often configured to conduct port leak (or disconnect) testing to detect failures in sleeve and/or pump pneumatics. One exemplary leak detection routine comprises the following:

1. Establishing at least one fill pressure point for a port (e.g., the pressure point relates to the pressure in at least one chamber of a sleeve);
2. Inflating the port until the at least one fill pressure is achieved;
3. Stopping inflation;
3. Measure an initial resulting pressure of the port;
4. Re-measure the pressure of the port after the initial resulting pressure measurement at least once;
5. Establishing at least one difference limit between the first resulting pressure and a re-measured pressure;
6. Utilizing the difference limit to determine the status of a port (e.g. leaking or normal)

Further time durations can be established between measurements to account for stabilization, continued monitoring, etc. The software can then make decision to deactivate the port, output error port information, etc. In certain optional embodiments, a leak detection routine comprises establishing at least one fill pressure point for a port and establishing a time limit to inflate to that pressure. Generally, the time limit set is a time duration that under normal conditions would be sufficient to inflate to the pressure point (e.g., 5 minutes or another appropriate predetermined time). The pressure of the port is then evaluated at the end of the time limit. If the port does not measure at the pressure point, that is indicative of a leak or disconnect.

The software is also often configured to conduct sleeve conditioning to stress pneumatic seals to induce failures. One exemplary conditioning routine comprises the following:

1. Establishing at least one treatment fill pressure for a port;
2. Establishing at least one conditioning fill pressure for a port greater than the treatment fill pressure;
3. Inflating a port until the conditioning fill pressure is achieved;
4. Testing the port status (e.g., leaking, blocked, normal)

The conditioning routine is most frequently conducted while the sleeve is not worn by a subject, for example, as the pressures in the conditioning routine exceed the therapeutic pressures. The intent in this routine is to stress the sleeve outside of normal operating conditions to expose weaknesses or failures in the assembly of the pneumatics. For example, if the normal operating range for the system is between 20-80 mmHg, a conditioning routine for stressing the sleeve could inflate all chambers to, for example, 120 mmHg statically or intermittently for an hour to stress the system. In frequent embodiments, a conditioning routine applies a pressure about 50% greater than the peak therapeutic operating range, or software protocol programming, for the system for the specific type of garment. Also often, a conditioning routine applies a pressure between about 40% to about 600% greater than the peak therapeutic operating range, or software protocol programming, for the system for the specific type of garment. Afterwards a leak test could be conducted using the port blockage and/or leak detection routines to identify pneumatic and/or port failures and/or sub-optimizations. Combining a conditioning and leak testing routine eliminates the need for separate devices to test the integrity of the compression system. In frequent embodiments, the system is adapted with software functionality to self-diagnose failures of the types noted herein.

The software and the system are also often configured to gradually increase and adjust pressures prior to output of treatment pressures. The purpose of this routine is to, for example, adjust the fill pressures so that the resulting pressure when all chambers are filled do not exceed the treatment pressure settings and to fit the sleeve to the body that may vary in size and position between treatment sessions. Due to chamber overlap and other factors, the chambers continue to change pressure as others are inflated or deflated so an over pressurization compared to treatment settings could result. The fitting pressure adjustments are performed on low pressures first where pressure overages can be compensated for prior to output of treatment pressures. As the pressures are increased and the sleeve is fitted, the magnitude of pressure adjustments and the risk of exceeding treatment pressures is reduced. An exemplary pressure routine comprises:

1. Establishing at least one treatment pressure for a port;
2. Inflating the port to at least a first inflation pressure below the treatment pressure;
3. Measuring a pressure of the port after the first inflation pressure is achieved;
4. Inflating the port to at least a second pressure based on at least the prior pressure measurement;
5. Repeating Steps 2-4 as necessary until the approximate treatment pressure is achieved.

The routine could further include deflating between each inflation or between sets of inflations. The end of the routine could further comprise of repeatedly inflating and deflating the port to the inflation pressures that resulted in the approximate treatment pressures. The routine could comprise establishing at least one difference limit between the fill pressure and treatment pressure and using the limit to determine a system status (e.g. leaking, over-pressure, normal, etc.).

During the fitting process, each of the air chambers is gradually filled to a greater pressure over the course of several inflation cycles to ensure that the sleeve(s) will function properly during treatment. The first inflation cycles will take the longest amount of time and will have the least amount of compression. Each subsequent fitting cycle will complete more quickly and will gradually build to the programmed compression settings. For optimal fitting results, the subject should remain in a relaxed position, avoiding rapid movements and changes in posture that could impact the pressure sensor measurements. The GUI may provide instructions to the subject to notify which aspect of the treatment cycle they are in, i.e., fitting and or treatment.

With a single flow output level from the compressor, fitting and treatment cycle times can be dependent on the number of sleeves attached, sleeve/limb size, and pressure settings. At default settings (e.g., 50 mmHg distal pressure, 3 mmHg step), total fitting cycle times optionally range between 5-9 minutes, and individual treatment cycle times range optionally between 33-46 seconds. In the main embodiments, the minimum cycle times for six, eight, and ten chamber sleeves are 18 seconds, 24 seconds, and 30 seconds respectively.

A GUI is optionally used to interact with the system in frequent embodiments. Alternatively, an analog, non-graphic user interface is utilized. A GUI positioned on the housing of the PCU is included in the most frequent embodiments. In addition, in certain embodiments, a GUI is provided on a remote application, a mobile application, or other remote device. A remote device is a device positioned externally to the main system but in data communication with the system and PCU. Wired remote devices are contemplated. Remote devices in wireless data communication with the system and PCU are also contemplated. A remote device or mobile application will often provide the same functionality and/or the same or similar GUI graphics as depicted and described herein for operating the system.

Figure 6A:
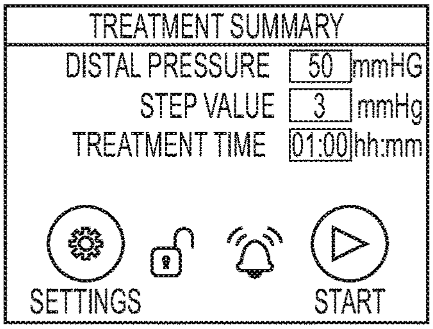
FIGS. 6A-6E depict an exemplary embodiment of settings on an exemplary GUI.
Figure 6B:
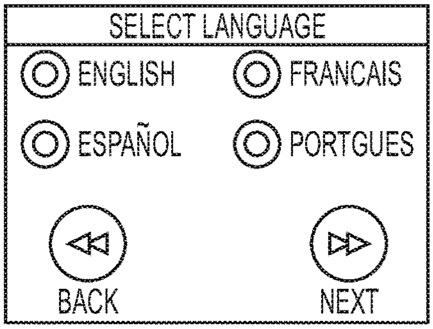
Figure 6C:
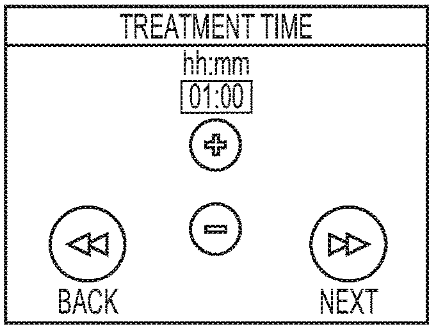
Figure 6D:
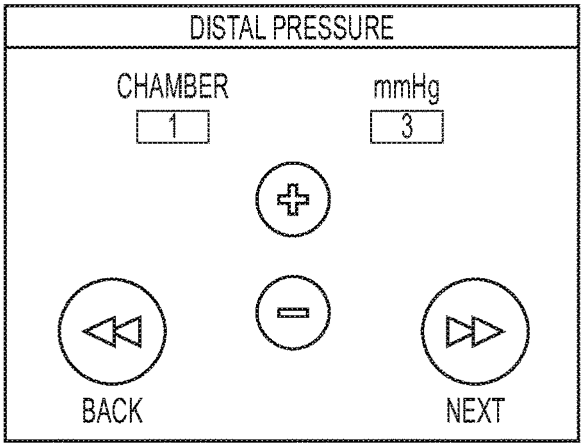
Figure 6E:
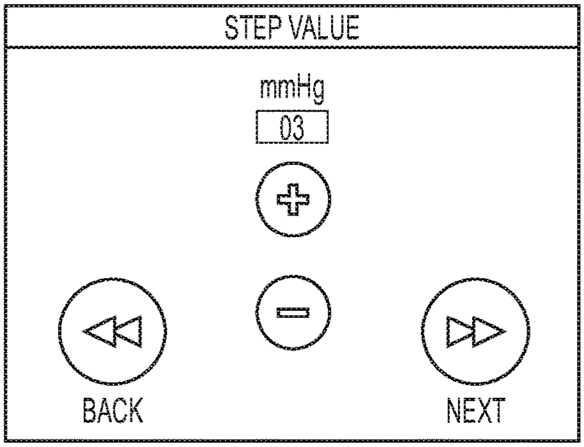
Figure 7A:
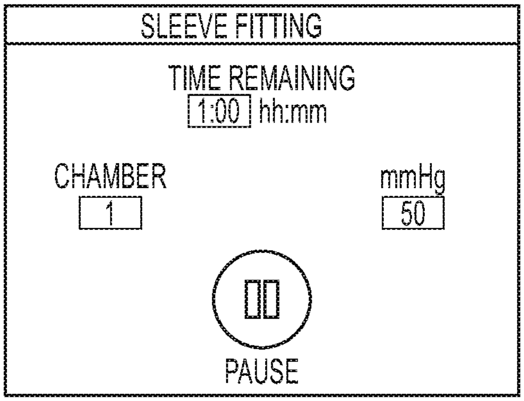
FIGS. 7A-7E depict an exemplary embodiment of settings on an exemplary GUI.
Figure 7B:
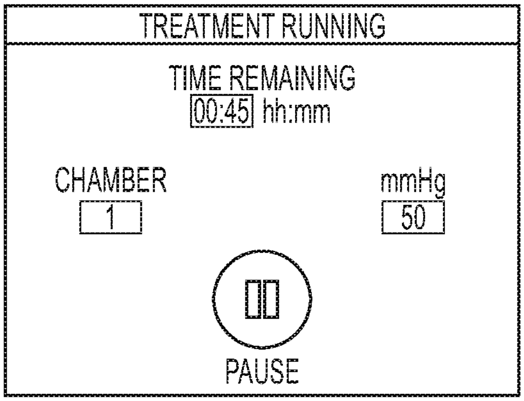
Figure 7C:
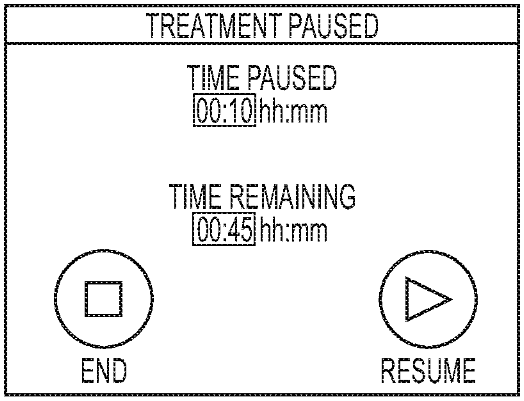
Figure 7D:
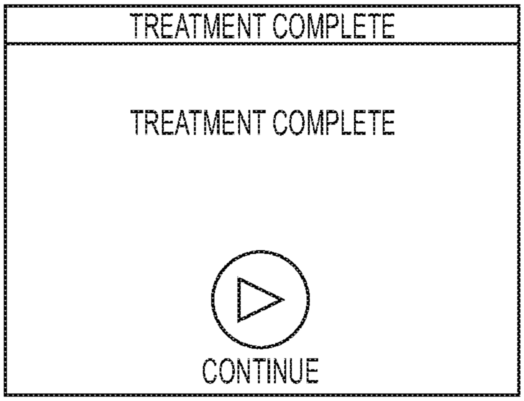
Figure 7E:
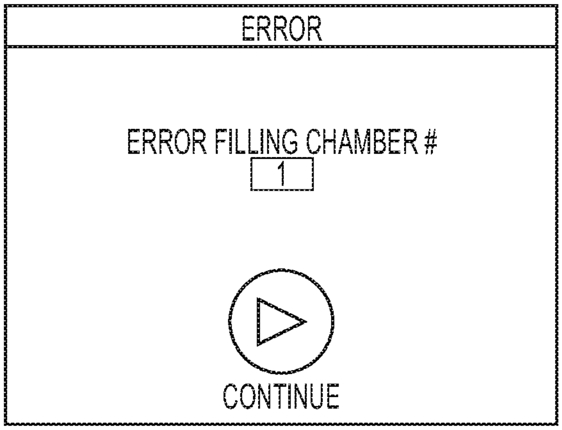

One exemplary embodiment of a treatment protocol as viewed on an exemplary GUI is provided in FIGS. 6A-6E and 7A-7E. FIG. 7A depicts a treatment summary screen that displays a summary of treatment parameters for the program currently stored in system memory. Two options exist on this screen, for starting treatment or accessing settings for treatment adjustment. FIGS. 6B-6E depict options in the treatment settings menu for adjusting treatment time, distal pressure and step value. The step value is the increment by which the compression level will decrease between each chamber of the garment going up the garment from distal to proximal. In one exemplary embodiment, the step value setting is changeable in 1 mmHg increments ranging up to 60 mmHg, with a minimum pressure of 20 mmHg. The specific therapeutic protocol will guide this setting. All chambers can be set to the same pressure value, or to have a stepped incremental predetermined difference (e.g., increase) in pressure from one chamber to the next. In one embodiment the PCU processor is preloaded with default settings of a distal pressure of 50 mmHg and a step value of 3 mmHg (FIG. 6E).

A couple of examples of step values programmable in the GUI include are as follows:

Example: A 6-chamber sleeve (lower leg) where the distal pressure is set to 50 mmHg with a step value of 3 mmHg.

| Chamber | 1 | 2 | 3 | 4 | 5 | 6 |
|---|---|---|---|---|---|---|
| mmHg | 50 | 47 | 44 | 41 | 38 | 35 |

Example 2: An 8-chamber sleeve (whole leg or arm) where the distal pressure is set to 80 mmHg with a step value of 15 mmHg.

| Chamber | 1 | 2 | 3 | 4 | 5 | 6 | 7 | 8 |
|---|---|---|---|---|---|---|---|---|
| mmHg | 80 | 65 | 50 | 35 | 20 | 20 | 20 | 20 |

The treatment time (FIG. 6C) comprises in certain embodiments the complete session time, including the initial sleeve fitting and treatment cycles. The treatment time can be set, for example, in certain increments, for example, ranging from 5 minutes to 3 hours. The specific therapeutic protocol will guide this setting. A fitting routine is generally included along with at least one treatment cycle in any treatment time setting. In certain embodiments, if the pre-set treatment time expires during a treatment cycle, the system is adapted to end the treatment session at the completion of that specific treatment cycle.

Certain of the information displayed and adjustable on the GUI are provided in the subsections below. The processor of the system is adapted to conduct pressure setting calculations, fitting cycles and calculations, and treatment cycles and calculations as set forth in these subsections. The processor has access to memory to provide for both data calculations and data storage related to these cycles and calculations.

Figure 8A:
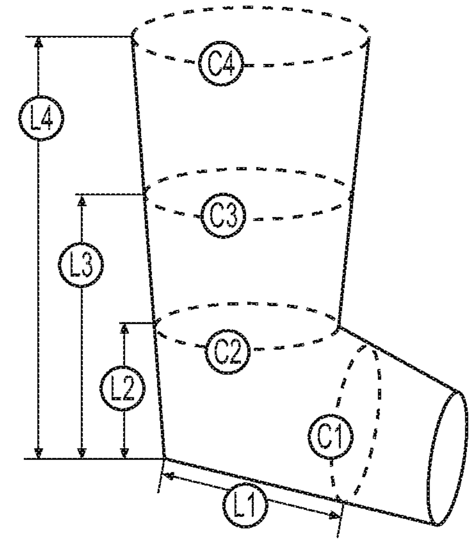
FIGS. 8A-8D depict exemplary leg sleeve functional depictions, showing chamber locations and dimensions
Figure 8B:
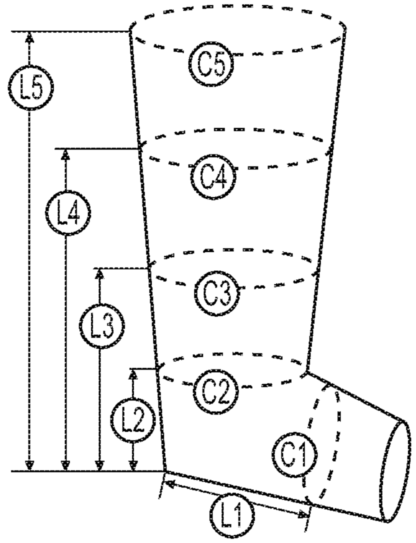
Figure 8C:
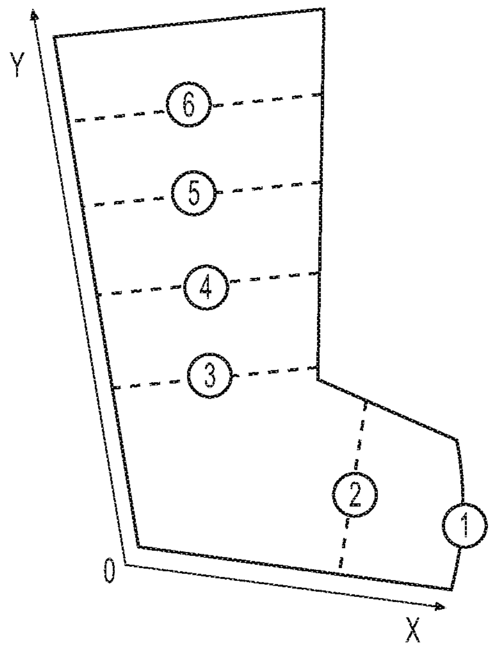
Figure 8D:
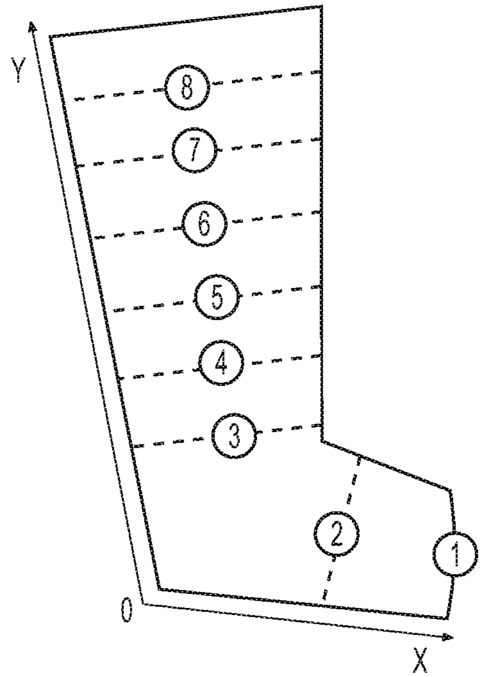
Figure 9A:
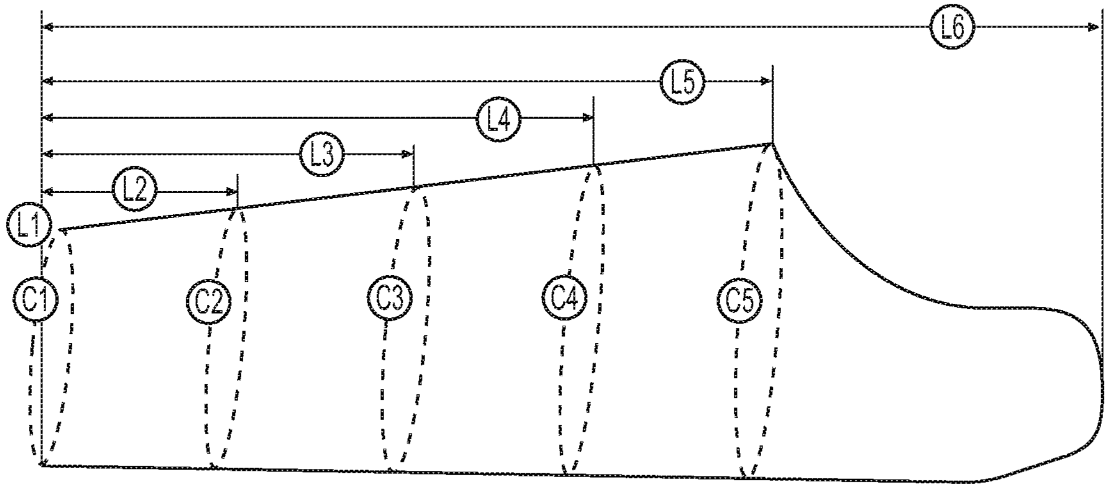
FIGS. 9A-9B depict exemplary arm sleeve functional depictions, showing chamber locations and dimensions.
Figure 9B:
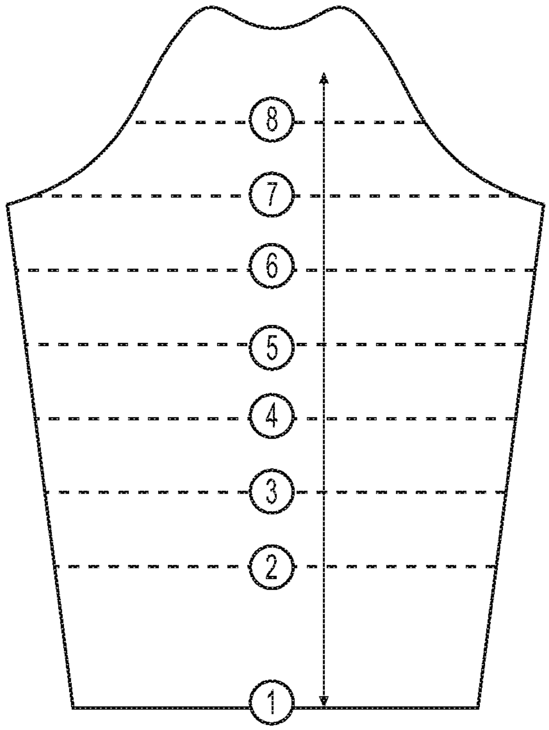
Figure 10A:
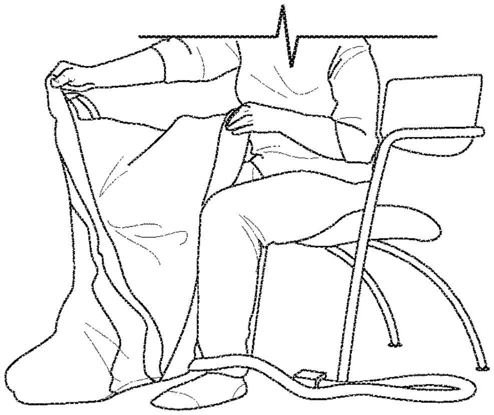
FIGS. 10A-10E depict exemplary compression garment donning steps.
Figure 10B:
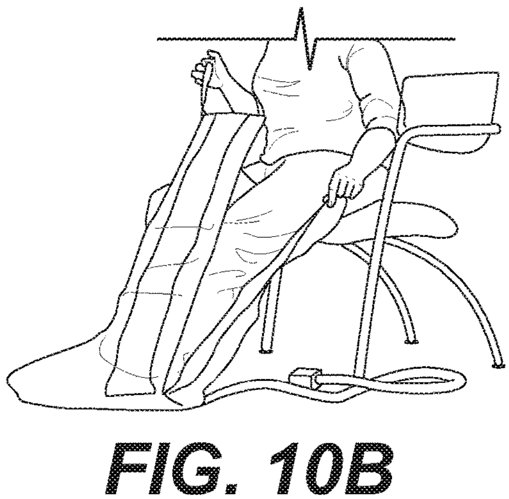
Figure 10C:
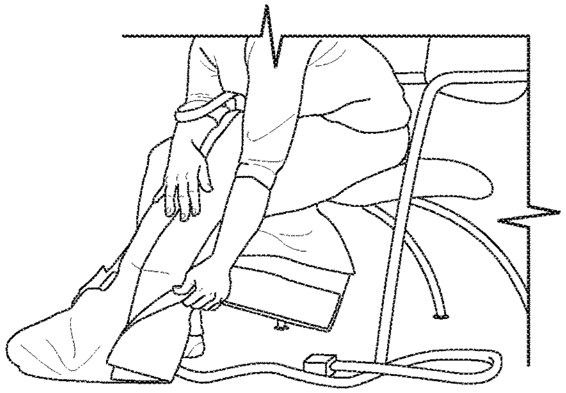
Figure 10D:
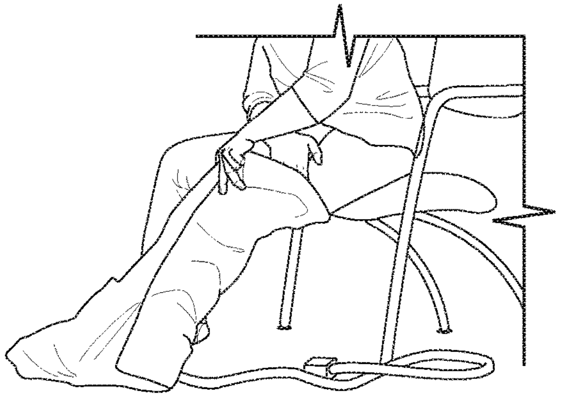
Figure 10E:
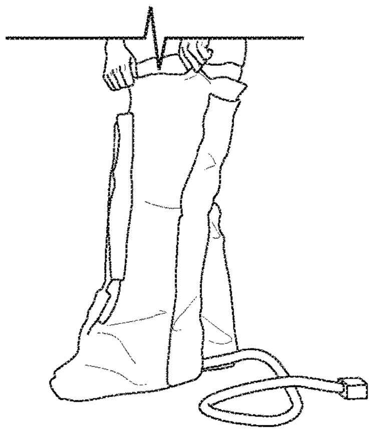
Figure 11A:
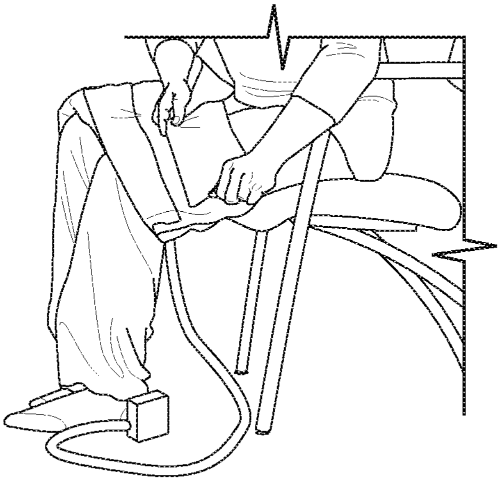
FIGS. 11A-11C depict exemplary compression garment donning steps.
Figure 11B:
Figure 11C:
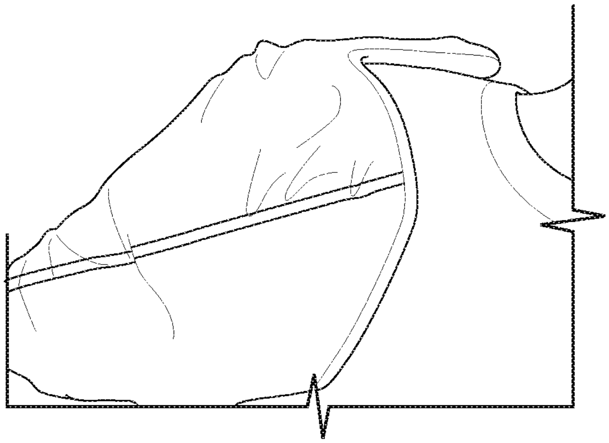

FIGS. 8A-8D and 9A-9B depict exemplary arm and leg sleeve functional depictions, showing chamber locations and dimensions. FIGS. 8A and 8C are lower leg sleeve functional depictions and FIGS. 8B and 8D are whole leg sleeve functional depictions. In FIGS. 8C, 8D, and 9B the number of chambers are depicted by the numbers. Also FIGS. 8A, 8B and 9A, in C1-C5 represent circumferential distances, and L1-L5 represent length distances.

With reference to FIGS. 8A-8D and 9A-9B, a sensor or imaging device associated with the evaluation of interstitial fluid volumes and flow rates may be placed in one or more locations of the sleeve, for example at any one or more of positions C1-C8, and/or outside of the garment. When a sensor or imaging device is placed outside the garment, it is often placed between the garment and the heart of the subject. Alternatively, or in addition, when the sensor or imaging device is placed outside the garment, at least one is also often placed between the garment and the heart of the subject and on any part of the limb that is not enveloped by the sleeve on the opposite side of the sleeve from the heart of the subject.

FIGS. 10A-10E and 11A-11C depict exemplary compression sleeve donning steps, leg and arm respectively. The sleeves are most frequently donned by a subject prior to connecting the sleeve to the PCU.

In making this connection (with reference to other Figures), the following exemplary procedure may be followed: (1) Locate the sleeve connector (FIG. 4B, 30) at the end of the fluid conduits 32 attached to the compression sleeve. The number of open ports will vary based on the sleeve model. (2) Insert the sleeve connector into the open port 15 on the front of the PCU (FIG. 1B). (3) Insert the blocking plate (FIG. 4A, 40) into the remaining open port 15 on the front of the PCU 10 and ensure that it is secure (FIG. 1C). If needed, the sleeve connector 30 and blocking plate 40 can be switched between ports 15. Also, if bilateral treatment is being administered (FIG. 1D), the blocking plate 40 is not utilized. In the main embodiments described herein, the compression output is the same for both ports. After treatment, disconnect the sleeve connector from the PCU 10 by pressing down on the latch mechanism and pulling the connector out. The blocking plate 40 can remain in place for future treatment sessions.

In certain embodiments a sleeve port adapter is utilized that further increases the effective number of ports available in a single system. For example, either port 15 may receive an adapter that further divides the 10 depicted output ports into, for example, 20 ports. This may occur to provide for the attachment of a sleeve with a larger number of chambers, or multiple sleeves (e.g., 2 or more) connected to a single port 15. Such an arrangement often provides the inflation of multiple chambers of a sleeve simultaneously. For example, if the first 5 open ports are directed to the first ten chamber sleeve, chambers one and two (for example) may inflate simultaneously, effectively creating a "5-zone" 10 chamber sleeve. This is of particular use where multiple sleeve are desired or needed. In this regard, for example, an arm sleeve and truncal sleeve may both be simultaneously utilized to treat one side of the body of a subject. In such an embodiment, four sleeves are simultaneously utilized, or may be simultaneously utilized, for compression treatment using a single PCU.

As is known in the art, edema refers to swelling associated with the accumulation and trapping of excess fluid in a fluid compartment of a body. This accumulation occurs in cells (cellular edema) or within the collagen-mucopolysaccharide matrix in the interstitial spaces (i.e., interstitial edema), and/or in other spaces in the body. Hydrostatic edema refers to excess interstitial fluid which results from elevated capillary hydrostatic pressure while permeability edema results from disruption of pore structure in the microvascular membrane such to render it less able to restrict the movement of macromolecules from the blood to interstitium. Lymphedema, as also discussed in detail herein, represents another form of edema and may result from impaired lymph pump activity, an increase in lymphatic permeability favoring protein flux from lumen to interstitial fluid, lymphatic obstruction (microfiliarisis), or as a byproduct of the removal of lymph nodes. Extracellular matrix or interstitial edema may occur as a result of aberrant changes in the pressures (hydrostatic and oncotic) across microvascular walls, alterations in endothelial wall molecular structures that occur as changes in hydraulic conductivity and the osmotic reflection coefficient for plasma proteins, or alterations in the lymphatic outflow system. Accumulation of interstitial fluid is generally regarded as detrimental to tissue function for a variety of reasons. For example, edema formation increases the diffusion distance for oxygen and other nutrients, which compromises cellular metabolism. It also limits the removal of potentially toxic byproducts of cellular metabolism.

Destruction of extracellular matrix proteins in this process due to the formation of reactive oxygen and nitrogen species and release of hydrolytic enzymes affects compliance characteristics of the interstitial matrix such that interstitial fluid pressure fails when it would otherwise normally increase to increase and thereby oppose the movement of fluid. This also negatively affects the typical tensional forces exerted by extracellular matrix proteins on anchoring filaments attached to lymphatic endothelial cells to facilitate lymphatic filling. Moreover, reductions in circulating plasma proteins, especially albumin, produce edema by decreasing plasma colloid osmotic pressure. Arteriolar vasoconstriction reduces the rise in capillary pressure that might otherwise occur in response to arterial or venous hypertension, and also acts to reduce the microvascular surface area available for fluid exchange secondary to precapillary sphincter closure. When venous pressure is elevated, the volume of blood within postcapillary venules, larger venules and veins increases and bulge into the extravascular compartment, causing an increase in tissue pressure. It is understood that even small increments in capillary pressure can result in large increases in fluid filtration rates across the microvasculature. For example, increasing capillary pressure by just 2 mmHg, as noted above in arterial hypertension, results in an initial 14-fold increase in fluid movement from the blood into the interstitium. See, e.g., Scallan et al., Capillary Fluid Exchange: Regulation, Functions, and Pathology (Morgan & Claypool Life Sciences 2010). Moreover, capillary hypertension results in the formation of a protein-poor ultrafiltrate that upon entry into the interstitial space raises interstitial fluid volume.

As such, removal of interstitial fluids characteristic of edema from swollen tissues is a goal of compression-related therapies. Providing compression to swollen tissues at optimal therapeutic levels is essential to these types of treatments. Nevertheless, often it is not known whether the compression level being applied is actually the optimum compression level, and instead a wait-and-see attitude is adopted. Even with the same type of condition or swollen tissue/limp, treatment and optimal compression levels can vary patient to patient. Though these therapies operate by providing static external pressure or compression levels, by contrast the underlying affect these compression levels have on fluid levels in interstitial fluids is dynamic. In an over-simplified manner, as fluids exit the interstitial spaces of swollen tissue, the amount of swelling decreases. In the case of a swollen limb, the size and circumference of that limb correspondingly decreases when the swelling decreases. With the decrease in size of the limb, the size of the static compression tool (garment, wrap, sleeve, etc.) must change to be able to continue to provide a therapeutic level of compression. To-date, such changes have involved re-measurement of the limb and/or re-calculation of compression tool size based on limb size to deliver the needed compression level, without regard to the underlying pathology of the edema condition. A time, duration, and/or frequency for applying compression is provided as a treatment plan that is adjusted at irregular intervals that are not necessarily tied to the actual therapeutic effect of the treatment.

The present disclosure contemplates providing a dynamic or periodic evaluation of the fluid (e.g., interstitial, venus, arterial, lymph, etc.) flow rates and/or volumes within, into and/or out of, swollen tissues before, during, and/or after compression therapy is utilized. Such an evaluation may be provided as an external input to the system contemplated herein. In related embodiments, a systemic measurement of fluid flow rates is evaluated as an alternative to or adjunct to local monitoring. Such an evaluation provides a measure of the effectiveness of the delivered therapy course and/or compression levels. The rate of fluid flow, including lymph and blood flow, within, into and/or out of, the swollen tissue is a measure of the effect the compression therapy on pressuring fluids to leave the affected area. Measuring such flow rates permits dynamic adjustment of compression levels to speed and improve clinical outcomes. The presently described systems are optimally situated to utilize such dynamic evaluations as applied compression levels can be evaluated and adjusted in a simultaneous manner to optimize the rate of fluid flow within, in or out of the swollen tissues that are the subject of the therapy. Fluid flow and volume measurements described herein may also be provided in connection with use of a compression garment with beneficial effects.

In one example of a treatment course, fluid (e.g., interstitial, venus, arterial, lymph, etc.) flow rates are evaluated during the course of a treatment protocol. For example, pressure is configured at multiple pre-determined levels and/or durations and/or sequences and the fluid flow rate into, out of, or within the treatment area is evaluated at each level to determine an optimal treatment protocol configuration. In another example, pressure is applied during a treatment cycle and the fluid flow rate into, out of, or within the treatment area is evaluated during treatment and a compression level is adjusted based on the flow rate evaluation.

Any of a variety of technologies, including combinations thereof, may be used in an interstitial, venus, arterial, or lymph flow rate evaluation according to the present disclosure. Such technologies may be provided as an external input to devices and systems of the present disclosure.

For example, pulse oximeters or photophlethysmographic devices, or adaptations thereof, may be utilized. Typically, such devices utilize a non-invasive sensor that transmits light through a patient's tissue and that photoelectrically detects the absorption and/or scattering of the transmitted light in such tissue. A sensor or probe may optionally be used to obtain a plethysmograph signal using high-pass filtering. Examples include, for example, U.S. Pat. Nos. 5,842,979, 8,577,434, 9,066,660; U.S. Pat. App. Pub. No. 20030073889.

Evaluating blood constituents in the swollen tissues to provide a measure of fluid flow rates is also contemplated. For example, hemoglobin, which is a blood component of may be measured. In this regard, an apparatus for determining concentrations of hemoglobins using a light source for emitting lights of at least three different wavelengths may be used. Such a device includes, for example, light of a first wavelength in a near-infrared wavelength region of 790 to 1000 nm, a second wavelength in a red wavelength region of 640 to 675 nm, and a third wavelength in a wavelength region of 590 to 660 nm; light receiving means for receiving lights that are emitted by the light source and transmitted through or reflected by a living tissue; an attenuation ratio processing means for processing attenuation ratios on the wavelengths based on variations of signals associated with the wavelengths output from the light receiving means, which variations are caused by a pulsation of blood; and concentration ratio processing means for processing concentration ratios of at least oxyhemoglobin, deoxyhemoglobin and carboxyhemoglobin based on the output signals from the attenuation ratio processing means. See, e.g., U.S. Pat. No. 6,415,236.

Alternatively or in addition, an infrared or near infrared imaging system used to enhance visibility of subcutaneous blood vessels may be utilized. Such systems are described, for example, in U.S. Pat. Nos. 6,556,858, 7,239,909, 9,968, 285. Such systems utilized varied imaging techniques involving illuminating body tissue with infrared light that arrives at the body tissue from a plurality of different illumination directions, or diffuse infrared light using an array of light-emitting sources. Such systems often utilize image capture means for receiving the infrared light reflected from the body tissue. In certain exemplary systems, a processor of the system is configured to alter infrared light output of the illumination devices and to determine reflectance intensities from the image frames captured by an image sensor. Output data such as dynamic tissue oxygen saturation maps may thereby be generated. Such spectroscopic techniques can be used, for example, to determine the component concentrations of a tissue, including, oxygenated hemoglobin, deoxygenated hemoglobin, and melanin.

Also, systems for detecting lymph and lymph nodes using fluorescent contrast agent are also contemplated. Such systems are described, for example, in U.S. Pat. No. 7,865,230; U.S. U.S. Pat. App. Pub. No. 20120268573. Such systems often involve directing near-infrared time-varying excitation light into the tissue of the body, causing the near-infrared time-varying excitation light to contact a lymph node of the lymphatic system, whereby a redshifted and time-varying emission light is generated, detecting the time-varying emission light at a surface of the body, filtering the time-varying emission light to reject excitation light re-emitted from the lymph node, and imaging the lymph node of the lymphatic system.

Optical coherence tomography (OCT) or functional optical coherence tomography (fOCT) also comprise contemplated technologies for use according to the present methods and in connection with the herein described systems. OCT is a non-invasive optical imaging technique that produces depth-resolved reflectance imaging through the use of a low coherence interferometer system. Three-dimensional (3D) visualization of structures in a variety of biological systems and non-biological systems not easily accessible through other imaging techniques is possible in such systems. In the present setting OCT provides a non-invasive manner of assessing fluid information without disturbing or injuring a target or sample. In such systems, low coherence light is administered using one or more wavelengths, and optical information is obtained from reflected signals. Optionally, 3D-imaging in the target is performed and flow rate of a fluid and/or a concentration of one or more target fluid constituents is determined from the acquired optical information. The rate of change of the one or more analyte concentrations in the target fluid constituent is thereby determined. fOCT employs OCT and provides a method of extracting a full set of optical properties from OCT spectra and simultaneously or substantially simultaneously extracting optical information to calculate flow rate of a fluid and a concentration of a particular target fluid constituent. Amplitude, intensity or phase, of the same OCT A-scan, are often used for determining a rate of change of the one or more target fluid constituents. Determining the rate of change of one or more analytes is often performed by comparing or using a reference such as healthy tissue or relative to a prior quantification. Such methods and systems are known in the art and can be adapted to methods and systems described herein. For example, U.S. Pat. App. Pub. Nos. 20150348287, 20070179368, 20140285812, 20160040978.

In addition to, or in lieu of, evaluating fluid flow rates, in certain embodiments the presently contemplated methods and systems are used in conjunction with methods of generating a shape of the swollen tissue derived from digital imaging of a patient body part using methods and systems described in, for example, U.S. Pat. App. Pub. No. 20180042322.

Many variations to those methods, systems, and devices described above are possible. Since modifications and variations to the examples described above will be apparent to those of skill in this art, it is intended that this invention be limited only by the scope of the appended claims.

One skilled in the art will appreciate further features and advantages of the presently disclosed methods, systems and devices based on the above-described embodiments. Accordingly, the presently disclosed methods, systems and devices are not to be limited by what has been particularly shown and described, except as indicated by the appended claims. All publications and references cited herein are expressly incorporated herein by reference in their entirety and/or for the specific reason for which they are cited herein. Citation of the above publications or documents is not intended as an admission that any of the foregoing is pertinent prior art, nor does it constitute any admission as to the contents or date of these publications or documents.

We claim:

1. An automated method of applying compression to the body of a subject comprising at least one fitting cycle and at least one treatment cycle, wherein the fitting cycle comprises:

- in one or more cycles delivering or removing an amount of a fluid to a chamber of a compression sleeve sufficient to adjust the chamber to a pre-calculated internal pressure less than a treatment pressure target comprising a predetermined percentage of the treatment pressure target and a fitting adjustment factor, and measuring an actual internal pressure of the sleeve after the delivery or removal of the amount of the fluid to the chamber of the compression sleeve, wherein the predetermined percentage of the treatment pressure target is less than 100%;
- determining a pressure difference comprising a difference between the actual internal pressure of the sleeve, the pre-calculated internal pressure and the fitting adjustment factor to generate a treatment cycle adjustment factor;
- wherein the treatment cycle comprises:
- in one or more cycles following the fitting cycle, delivering or removing the amount of the fluid to the chamber of the compression sleeve sufficient to adjust the chamber to the calculated internal pressure comprising the predetermined percentage of a treatment pressure target and the treatment cycle adjustment factor, wherein the predetermined percentage of the treatment pressure target is not less than that of the last fitting cycle.

2. The automated method of claim 1, wherein the fitting adjustment factor and the treatment cycle adjustment factor for a corresponding cycle is based wholly or in part on a difference between a calculated internal pressure, an actual internal pressure measurement, a treatment pressure target, and/or another adjustment factor.

3. The automated method of claim 1, wherein an adjustment factor for a cycle is based at least partially, or wholly, on a delivery constant.

4. The automated method of claim 1, wherein the fluid is removed or permitted to escape from the chamber between two or more delivering cycles.

5. The automated method of claim 1, wherein fluid is added to the chamber between two or more delivering cycles.

6. The automated method of claim 1, wherein the calculated internal pressures are limited to avoid the actual internal pressure of the sleeve exceeding the treatment pressure target.

7. The automated method of claim 1, wherein the calculated internal pressures are limited to avoid an actual internal pressure of the sleeve dropping below the treatment pressure target.

8. The automated method of claim 1, wherein the sleeve comprises a plurality of chambers.

9. The automated method of claim 8, wherein in a delivery cycle the actual internal pressure of the sleeve reaches an approximate treatment pressure target.

10. A non-transitory computer readable medium comprising a memory storing instructions adapted to carry out the method of claim 1, which when executed by a processor present in a pneumatic compression system and adapted to independently operate a plurality of valves, and/or a pump in the system, cause the processor to: (i) receive pressure data from a pressure transducer; and (ii) in an automated manner based on the received pressure data, operate the pump and/or valves.

11. A system for applying compression to the body of a subject, wherein the system comprises:

- a pump adapted to pump the fluid,
- a fluid pathway situated between the pump and a vent valve, wherein a check valve, a plurality of pressure valves, a pressure transducer, and an output block are provided in the fluid pathway; and
- a compression sleeve,
- in one or more cycles delivering or removing an amount of a fluid to a chamber of a compression sleeve sufficient to adjust the chamber to a pre-calculated internal pressure less than the treatment pressure target comprising a predetermined percentage of a treatment pressure target and a fitting adjustment factor, and measuring an actual internal pressure of the sleeve after the delivery or removal of the amount of the fluid to the chamber of the compression sleeve, wherein the predetermined percentage of the treatment pressure target is less than 100%;
- determining a pressure difference comprising a difference between the actual internal pressure of the sleeve, the pre-calculated internal pressure and the fitting adjustment factor to generate a treatment cycle adjustment factor;
- wherein the treatment cycle comprises:
- in one or more cycles following a fitting cycle, delivering or removing the amount of the fluid to the chamber of the compression sleeve sufficient to adjust the chamber to the calculated internal pressure comprising the predetermined percentage of a treatment pressure target and the treatment cycle adjustment factor, wherein the predetermined percentage of the treatment pressure target is not less than that of the last fitting cycle.

12. The system of claim 11, wherein each of the plurality of pressure valves is operable between an open state and a closed state, and wherein each of the plurality of pressure valves is operable independently or concurrently with each other of the plurality of pressure valves.

13. The system of claim 11, wherein two or more of the plurality of pressure valves are provided in unwired operable connection with a printed circuit board.

14. The system of claim 11, wherein the output block comprises a plurality of input ports, each in communication with one or more output ports, wherein the number of input ports is less than a total number of the one or more output ports.

15. The system of claim 14, wherein each of the plurality of pressure valves is situated in the fluid pathway between the output block and the check valve.

16. The system of claim 14, wherein the compression sleeve comprises two or more chambers, each of the two or more chambers in internal fluid communication with two or more fluid conduits, and wherein each of the two or more fluid conduits is adapted to be attachable in internal fluid communication with one of the one or more output ports.

17. The system of claim 14, comprising a 2 to 20 pressure valves and between 4 to 40 output ports.

18. The system of claim 14, wherein one or more compression sleeves are attachable to output block.

19. The system of claim 11, wherein the pressure transducer comprises a single pressure transducer in fluid communication with the chamber, and the pressure transducer is adapted to measure the actual internal pressure.

20. The system of claim 19, wherein the pressure transducer comprises a single pressure transducer in fluid communication with the 4 to 40 output ports, and the pressure transducer is adapted to measure the actual internal pressure.

* * * * *